(12) United States Patent
Suda et al.

(10) Patent No.: US 7,625,828 B2
(45) Date of Patent: *Dec. 1, 2009

(54) INSULATION PRODUCT HAVING NONWOVEN FACING

(75) Inventors: David I. Suda, Warrington, PA (US); Michael J. Lembo, Souderton, PA (US); Andreas H. Unruh, Hatfield, PA (US); Joyce A. Chunko, Hazleton, PA (US); Richard J. Ray, Jr., Downingtown, PA (US)

(73) Assignee: Certainteed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/753,741

(22) Filed: Jan. 8, 2004

(65) Prior Publication Data

US 2005/0153612 A1 Jul. 14, 2005

(51) Int. Cl.
*B32B 17/02* (2006.01)
*B32B 27/02* (2006.01)

(52) U.S. Cl. .................. 442/164; 442/180; 442/381; 442/386; 442/389; 442/390; 442/391

(58) Field of Classification Search .............. 442/180, 442/381, 389, 386, 390, 391, 164
See application file for complete search history.

(56) References Cited

U.S. PATENT DOCUMENTS

| | | |
|---|---|---|
| 2,341,130 A | 2/1944 | Unsworth |
| 2,543,101 A | 2/1951 | Francis, Jr. |
| 3,642,554 A | 2/1972 | Hensley |
| 3,955,031 A | 5/1976 | Jones et al. |
| 3,958,385 A | 5/1976 | Bondra et al. |
| 4,101,700 A * | 7/1978 | Ray et al. .......... 428/131 |
| 4,201,247 A | 5/1980 | Shannon |
| 4,263,007 A | 4/1981 | Battigelli et al. |
| 4,310,585 A | 1/1982 | Shannon |
| 4,316,865 A | 2/1982 | Battigelli et al. |
| 4,342,610 A | 8/1982 | Ray, Jr. |
| 4,661,392 A | 4/1987 | Kapstad |
| 4,709,523 A | 12/1987 | Broderick et al. |
| 4,756,945 A | 7/1988 | Gibb |

(Continued)

FOREIGN PATENT DOCUMENTS

DE 4108110 A1 12/1991

(Continued)

OTHER PUBLICATIONS

Office Action Dated Jun. 27, 2007, in Related U.S. Appl. No. 10/753,603, 9 pages.

(Continued)

*Primary Examiner*—Ula C Ruddock
(74) *Attorney, Agent, or Firm*—Duane Morris LLP

(57) ABSTRACT

An insulation product is provided comprising a low density mat containing randomly oriented inorganic fibers bonded by a heat cured binder. The mat has first and second major surfaces and a pair of side portions. A nonwoven sheet is bonded to the first major surface. The nonwoven sheet comprises randomly oriented glass fibers and is bonded to the first major surface by the heat cured binder.

9 Claims, 5 Drawing Sheets

U.S. PATENT DOCUMENTS

| | | | |
|---|---|---|---|
| 4,972,644 | A | 11/1990 | Rumiesz, Jr. et al. |
| 5,032,431 | A | 7/1991 | Conner et al. |
| 5,169,700 | A | 12/1992 | Meier et al. |
| 5,217,766 | A | 6/1993 | Flonc et al. |
| 5,236,754 | A | 8/1993 | McBride et al. |
| 5,246,514 | A | 9/1993 | Alderman et al. |
| 5,302,332 | A | 4/1994 | Simola et al. |
| 5,331,787 | A | 7/1994 | Paulitschke et al. |
| 5,545,279 | A | 8/1996 | Hall et al. |
| 5,578,258 | A | 11/1996 | Grant et al. |
| 5,685,938 | A | 11/1997 | Knapp et al. |
| 5,783,268 | A | 7/1998 | Noonan et al. |
| 5,804,254 | A | 9/1998 | Nedwick et al. |
| 5,848,509 | A | 12/1998 | Knapp et al. |
| 5,900,206 | A | 5/1999 | Pellegrin et al. |
| 5,942,288 | A | 8/1999 | Kajander |
| 6,171,654 | B1 | 1/2001 | Salsman et al. |
| 6,207,245 | B1 | 3/2001 | Miller et al. |
| 6,270,865 | B1 * | 8/2001 | Noonan et al. ............. 428/34.5 |
| 6,357,504 | B1 | 3/2002 | Patel et al. |
| 6,415,573 | B1 | 7/2002 | Moulder |
| 6,444,073 | B1 | 9/2002 | Reeves et al. |
| 6,551,677 | B2 | 4/2003 | Weinstein et al. |
| 2002/0091185 | A1 | 7/2002 | Taylor et al. |
| 2004/0176003 | A1 | 9/2004 | Yang et al. |
| 2004/0219847 | A1 | 11/2004 | Miller |
| 2005/0098255 | A1 | 5/2005 | Lembo et al. |
| 2005/0186877 | A1 | 8/2005 | Yang et al. |
| 2007/0060005 | A1 | 3/2007 | Yang et al. |

FOREIGN PATENT DOCUMENTS

| | | |
|---|---|---|
| EP | 0565392 B2 | 10/1993 |
| WO | WO 93-16874 A1 | 9/1993 |
| WO | WO 94-29540 A1 | 12/1994 |

OTHER PUBLICATIONS

Barker, R.L., "Evaluating operating room gowns: comparing comfort of nonwoven and woven materials", International Nonwovens Journal, www/inda/subscrip/inj00_1/p230.html, pp. 1-10, Mar. 12, 2002.
British Gypsum-Isover, Isowool Comfort, Glass Mineral Wool Insulation Encapsulated in a Super-Soft Fabric Providing Therman and Acoustic Insulation in Roofs and Ceilings, Product Information, 2 pages, Jul. 2004.
CertainTeed Corporation, "Specification Sheet ToughGard™ Duct Liner with Enhanced Surface", 2001.
CertainTeed Corporation, "Certa*Faced Ultra*Duct Marketing Plan", Nov. 22, 1993.
CertainTeed Corporation, "List Prices—ToughGard Duct Board", Oct. 1, 1994, Valley Forge, Pennsylvania, USA.
CertainTeed Corporation, "Product Sheet—ToughGard Duct Board Fiber Glass Duct Board Systems", 1994, Valley Forge, Pennsylvania, USA.
CertainTeed Corporation, "Product Specification: PS 57.00", May 23, 1994.
CertainTeed Corporation, "Raw Material Specification: Certa*Faced Ultra*Duct Mat Facing", Jun. 23, 1994.
CertainTeed Corporation, "Specification Sheet—ToughGard Duct Board with Enhanced Surface", Jan. 2002.
CertainTeed Corporation, "Specification Sheet—ToughGard Duct Board with Enhanced Surface", May 2001.
CertainTeed Corporation, "Specification Sheet—Ultra*Duct Gold", Mar. 2002.
CertainTeed Corporation, CertainTeed Building Solutions, "Product Information," CertainTeed Duct Insulation, Dec. 30, 2002.
CertainTeed Spec. Sheet, ToughGard™ Duct Board, 2 pages, Apr. 2001.
CETIAT "Test Report" Jul. 24, 1991, 3 pages (translation attached).
Climaver 234 (1982).
Climaver 254 (1984).
Climaver 264 (1982).
Climaver 284-234 "Construction and self-support air conditioning ducts", 4 pages (translation attached) (1988).
Climaver Plata, Specification of a Product, Relevance on first page, density 70 kg/m$^3$ (not translated) (1992).
Dent, R.W., "An Analysis of Fabric 'Hand' and 'Feel'", International Nonwovens Journal, www/inda/subscrip/inj00_1/p11.html, pp. 1-11, Mar. 12, 2002.
Elasti-Glass® R3100B Series Glass Fiber Mats, Schuller, 2 pages (May 1997).
France -Air, "Glass Fibre panels for air ducts" (translation attached), 21 pages (1992).
French Republic, National Testing Laboratory, Nov. 28, 1998, 1 page (translation attached).
Glass Fiber Manufacturing, Mineral Products Industry Sep. 1985 (reformatted Jan. 1995), pp. 11.13-11.13-6.
Glasuld "Product Data-Industrial Sheet Black" Sheet: 172 p. 1, Nov. 1989, 1 page (translation of parts of the Danish ventilation duct product "Iindustriplade Sort" attached).
Glasuld Ventilations-Kanaler (translation of parts of the Danish Duct Application brochure attached), Dec. 1989.
Glasuld, Superfos Glasuld, Glasuld Perfofilt, "Superfos Glass Wool," product literature, Jan. 1975 (translation from Danish attached).
Isover "Game Climaver".
Isover Gullfiber —translation of the relevant parts of the Swedish Product Catalogue for Technical Insulation Mar. 1989.
Isover Saint-Gobain Roche & Verre-Insulation and Air Conditioning, Mar. 1990, 3 pages (translation attached).
Johns Manville, Glass Fiber Mats, Elasti-Glass® 3200B Series, 1 p., Oct. 30, 2002.
Johns-Manville, "Type PM 10/3 Microlith®—Glass Fiber Nonwoven", Nov. 2003.
Johns-Manville, "Type PM 10/4 Microlith®—Glass Fiber Nonwoven", Dec. 2003.
Johns-Manville, "Air Handling Systems—Linacoustic RC™ Fiber Glass Duct Liner with Reinforced Coating System," (preliminary product information), AHS-329 Feb. 2002.
Johns-Manville, Air Handling Systems—SuperDuct™ Coated High Performance Air Duct Board, Type 475 & 800, AHS 200 Jun. 2000.
Kim, H.S. et al., "Characterizing Fuzz in Nonwoven Fabrics", International Nonwovens Journal, www/inda/subscrip/inj00_1/p18.html, pp. 1-8, Mar. 11, 2002.
Knauf Air Duct Board, Form No. AH-SS-2 Effective: Jan. 1998, 2 pages.
Knauf Fiber Glass GmbH, "Submittal Sheet—Air Duct Board-M with Hydroshield Technology", Oct. 2000, USA.
Knauf Fiber Glass Insulation—Products 7 pages, Feb. 2002.
Knauf Fiber Glass Insulation—Products, Knauf Air Duct Board-M www.Knauffiberglass.com/index.cfm?fuseaction=prd.dspProd-Detail&Id=14, pp. 1-6, © 2003.
Lydall, 23# Manniglas® 1803 WHB, Developmental Lot F2956, Data Sheet, 1 page, Nov. 20, 2002.
Lydall, 27# Manniglas® 1807, Developmental Grade Lab Handsheets, Data Sheet, 1 page, Jan. 8, 2004.
Lydall, 40# Manniglas® 1786 BX Black, Developmental Lot F2933, Data Sheet, 1 page, Nov. 20, 2002.
Lydall, 40# Manniglas® 1886 Black, Data Sheet, 1 page, Aug. 20, 2002.
Lydall, 40# Manniglas® 1886 Black, Product Specification, 1 page, Apr. 24, 2003.
Nordson, Center of Excellence Bi-Component Nonwovens Pilot Line, COE II Specifications, 4 pages, 2002.
North American Insulation Manufacturers Association, "Fibrous Glass Commercial Insulation Boards", Insulation Facts #67, www.naima.org, Jan. 2003.
North American Insulation Manufacturers Association, "Fibrous Glass Duct Wrap", Insulation Facts #66, www.naima.org, Jan. 2003.
North American Insulation Manufacturers Association, "Fibrous Glass Duct Construction Standards", 2nd Edition, 1993.
Saint-Gobain Insulation, Facing of "Comfort Products," (mainly extracted from purchasers' working group with Nathalie Rose (CRIR) in 2001), T Gasser- CRIR, Oct. 25, 2002, 11 pages.

Saint-Gobain Isover Oy, Isover Comfort KL-C, product information, http://www.isover.fi/en/products/default.asp?aid=1&bid=4&cid=282&val=1, 3 pages, Sep. 2004.

Testing Data from the Competitive Audit on Mar. 25, 1999, 3 pages.

Trends, Index '99, "Nordson debuts new look, new products at Index '99", pp. 1-4, vol. 11, No. 1, Apr. 1999.

Underwriters Laboratories Inc., "Investigation of 'Climaver 284' Air Duct Board", Dec. 19, 1991, Northbrook, Illinois, USA.

Underwriters Laboratories Inc., "Report on Air Ducts", Jun. 8, 1992, Northbrook, Illinois, USA.

Certainteed CrimpWrap Crimped Pipe and Tank Wrap Specification Sheet, Dec. 2002, 2 pages.

Flex-Clad 400™, Data Sheet, MFM Building Products Corp., Coshocton, OH, 1 page.

Flex-Clad 400™, www.flexclad.com, web site home page, MFM Building Products Corp., Coshocton, OH, accessed Jul. 24, 2004, 2 pages.

VentureClad™ 1577CW®, Venture Tape Corp., Rockland, MA, product literature, 1 page.

LAMTEC Product Specifications for R-3070 Foil/Scrim/Kraft, www.lamtec.com/PS-R3070.htm, last updated May 11, 2004, Lamtec Corporation, 3 pages.

Response to Office Action with Claims as Allowed Dated Oct. 8, 2008 for U.S. Appl. No. 10/753,603.

Notice of Allowance dated Feb. 10, 2009 in U.S. Appl. No. 10/753,603.

\* cited by examiner

INSULATION PRODUCT HAVING NONWOVEN FACING

CROSS-REFERENCE TO RELATED APPLICATION

This application relates to U.S. application Ser. No. 10/753,603 to the same inventors, entitled "Method of Making Insulation Product Having Nonwoven Facing" filed on the same date herewith.

FIELD OF INVENTION

The present invention relates to inorganic fiber insulation products having one or more facings thereon, and more particularly, to low density inorganic fiber insulation mats or batts having a nonwoven facing adhered to at least one major surface thereof.

BACKGROUND OF THE INVENTION

Batt insulation is commonly manufactured by fiberizing mineral fibers from a molten mineral bath by forcing them through a spinner rotating at a high number of revolutions per minute. The fine fibers are then contacted by a pressurized hot gas to draw the fibers to a useable diameter and length. The fibers are typically sprayed with a phenolic resin binder. The fibers are then collected and distributed on a conveyor to form a mat. The resin is then cured in a curing oven. The mat is then sliced into lengthwise strips having desired widths and chopped into individual batts. In some cases, a facing material, such as Kraft paper coated with a bituminous material or other vapor retarder, is added to the mat prior to the cutting step.

One of the known problems associated with installing glass fiber insulation materials is that they generate glass particle dust, which can be a cause of irritation to workers by contact with skin and eyes or by respiration. One way to reduce glass dust is to encapsulate insulation batts with a facing that reduces dust, but which is porous, and vapor permeable. W094/29540, assigned to Owens Corning Fiberglas Corporation, teaches a polymeric facing which is adhered to one or both major surfaces of the batt with a fastening means, such as a small amount of adhesive material. The adhesive material is of a sufficiently small amount so as to enable the insulation batt not to exceed a flame spread rating of 25 using the ASTM E-84 flame spread test. The adhesive should be applied in sufficient quantity to bond the facing to the mineral fiber batt and enable the batt to be picked up and handled by the facing. The facings described in this reference are suggested to be a polypropylene or polyethylene material, which is adhered, stuck or heat sealed to the major surfaces of the batt.

Knapp et al., U.S. Pat. No. 5,848,509 commonly assigned with the instant application, teaches encapsulated glass fiber insulation within a nonwoven covering material. The nonwoven covering is disposed over the top surface of a mineral fiber core and extends adjacent the side surfaces. The covering is preferably formed from a web of nonwoven material, such as polyester, polypropylene, polyethylene or rayon, and is preferably applied to the top and sides of the glass fiber mat with a hot melt or suitable adhesive.

In order to provide insulation mats with encapsulated nonwoven coverings or films, quantities of adhesive must also be stored for adhering these coverings to batt insulation. Many adhesives and glues have a limited shelf life. Additionally, spraying these adhesives on batt surfaces requires constant cleanup and maintenance of manufacturing equipment and the work area. Still further, prior art encapsulated mats that utilize synthetic nonwoven facing layers such as polyester have proved difficult to cut in the field.

Accordingly, there remains a need for an encapsulated or faced insulation material which can be made less expensively, but which still reduces dust and permits air evacuation when the insulation product is compressed for packaging and which provides for improved ease of installation.

SUMMARY OF THE INVENTION

The present invention provides an insulation product comprising a low density mat containing randomly oriented inorganic fibers bonded by a heat cured binder. The mat has first and second major surfaces and a pair of side portions. A nonwoven sheet is bonded to the first major surface. The nonwoven sheet comprises randomly oriented glass fibers and is bonded to the first major surface by the heat cured binder.

Fiberglass insulation products are often covered with polymer films or nonwoven materials by adhering a polymeric facing to one or more exposed sides of a batt. The present invention uses techniques for applying a nonwoven layer on at least a first major surface of an insulation mat or batt and provides products made thereby. This is very cost efficient since it generally eliminates the need for multiple sizes of nonwovens or films for different product sizes. Direct formation and application of a nonwoven fabric or film directly on a fiberglass insulation mat or batt without the need for a separate adhesive, other than the heat curable binder used in the batt, to adhere the fabric or film to the batt or mat surfaces also provides process economics. Still further, the nonwoven layer, particularly when comprising glass fibers, provides an excellent surface for field cutting of the insulation product.

In another embodiment, the insulation product includes a low density mat containing randomly oriented glass fibers bonded by a heat cured binder. The mat has first and second major surfaces and a pair of side portions. The mat is heated to cure the binder at a temperature between about 300-600° F. A nonwoven sheet is bonded to the first major surface. The nonwoven sheet comprises randomly oriented fibers having a melting temperature above about said curing temperature. The nonwoven sheet is applied to the mat before the binder is cured and bonded to the first major surface by the heat cured binder.

In another embodiment, the insulation product includes a low density mat containing randomly oriented glass fibers bonded by a heat cured binder. The mat has a first and second major surfaces and a pair of side portions. A nonwoven sheet is bonded to the first major surface. The nonwoven sheet includes first randomly oriented fibers and second randomly oriented fibers. The first randomly oriented fibers have a melting point above a temperature used in curing the mat and the second randomly oriented fibers have a melting point below the temperature used in curing the mats. The nonwoven sheet is bonded to the first major surface at least in part by a melt bond between the second randomly oriented fibers and the randomly oriented glass fibers in the low density mat.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

Provided herein are methods for making low density insulation products and the low density insulation products made thereby. Insulation materials generally span the range from light weight, flexible and resiliently compressible foams and nonwoven fiber webs to rigid or semi-rigid boards. Generally, these insulating materials have densities in the range of about 0.5-7 lb/ft$^3$ (8-112 kg/m$^3$). Foam and nonwoven fiber web materials are usually provided in continuous sheeting that is sometimes cut to preselected lengths, thus forming batts. These articles usually are "low density," in the range of about 0.5-6 lb/ft$^3$ (8-96 kg/m$^3$), and preferably about 1-4 lb/ft$^3$ (16-64 kg/m$^3$), and more preferably 0.3 to 1.5 lb/ft$^3$ (4.8-24 kg/m$^3$). The thickness of the insulation blanket or mat is generally proportional to the insulated effectiveness or "R-value" of the insulation. These low density insulation mats typically have a thickness between about 3.5-10 inches.

In contrast, rigid to semi-rigid insulation boards ("high density" insulation) tend to have densities in the higher portion of the range, at about 2-7 lb/ft$^3$ (32-112 kg/m$^3$), and preferably at about 4-7 lb/ft$^3$ (64-112 kg/m$^3$). These boards customarily are produced as sheets typically in the range of 0.25-2 inches in thickness and about 2-4 feet wide by about 4-12 feet long.

Figure 1:
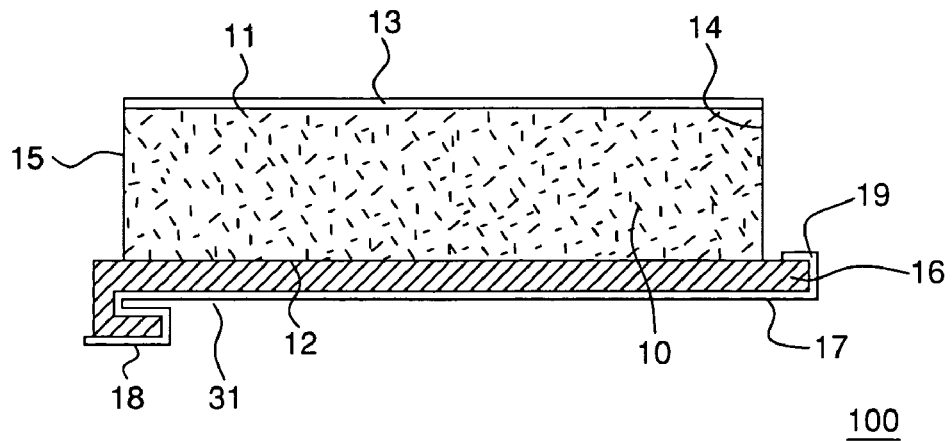
FIG. 1 is a side elevation view of an insulation product of this invention.
Figure 2:
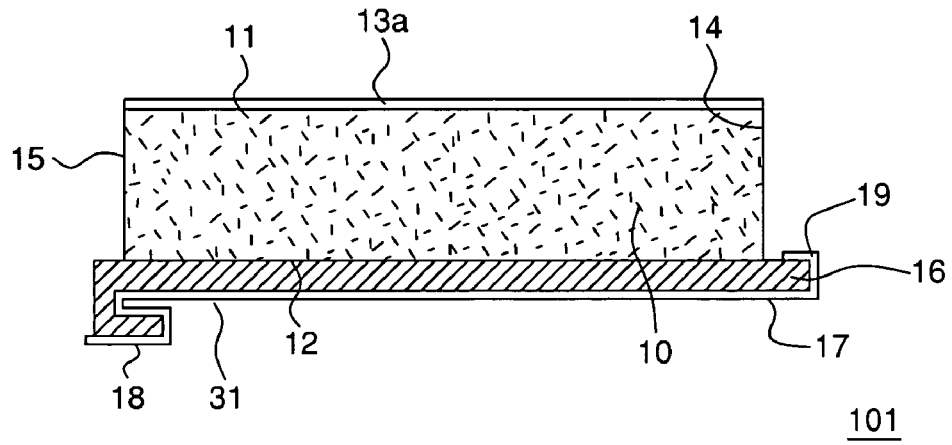
FIG. 2 is a side elevation view of an insulation product alternative of this invention.

With reference to the Figures, and more particularly to FIGS. 1-2 thereof, there are shown two insulation products 100 and 101. Insulation products 100 and 101 include a low density insulation blanket or mat 10 (as described above) formed from organic fibers such as polymeric fibers or inorganic fibers such as rotary glass fibers, textile glass fibers, stonewool (also known as rockwool) or a combination thereof. Mineral fibers, such as glass, are preferred. In some embodiments, a vapor retarder facing layer 17, which may be a cellulosic paper, typically formed from Kraft paper, coated with a bituminous adhesive material, such as asphalt, or polymeric film, such as LDPE (low density polyethylene), is provided on one major surface 12 of the insulation blanket or mat 10. The facing layer 17 and bituminous layer 16 together form bitumen-coated Kraft paper 31. The coating is preferably applied in a sufficient amount so as to provide an effective barrier or retarder for water vapor, for example, so as to reduce the water vapor permeability of the preferred Kraft paper to no more than about one perm when tested by ASTM E96 Method A test procedure. In other forms, where a vapor retarder or barrier is not desired, the insulation blanket or mat 10 can have no facing on its second major surface 12. Optionally, the facing layer 17 can be secured to the bottom of major surface 12 of the insulation blanket or mat 10 by an adhesive, such as a hot-melt adhesive.

In batt insulation 100 and 101, a pair of side tabs 18 and 19 are provided which can be unfolded and fastened to wooden or metal studs, for example. Various known configurations for side tabs or flaps 18 and 19 are known. Alternatively, there can be no tabs on the Kraft facing. The facing layer 17 can be water vapor impermeable or permeable, depending on its makeup, degree of perforation, and intended use.

The insulation blanket or mat 10 is typically formed from glass fibers, often bound together with a heat cured binder, such as known resinous phenolic materials, like phenolformaldehyde resins or phenol urea formaldehyde (PUFA). Melamine formaldehyde, acrylic, polyester, urethane and furan binder may also be utilized in some embodiments. The insulation is typically compressed after manufacture and packaged, so as to minimize the volume of the product during storage and shipping and to make handling and installation of the insulation product easier. After the packaging is removed, the batt insulation products 100 or 101 tend to quickly "fluff up" to their prescribed label thickness for insulation.

Figure 4:
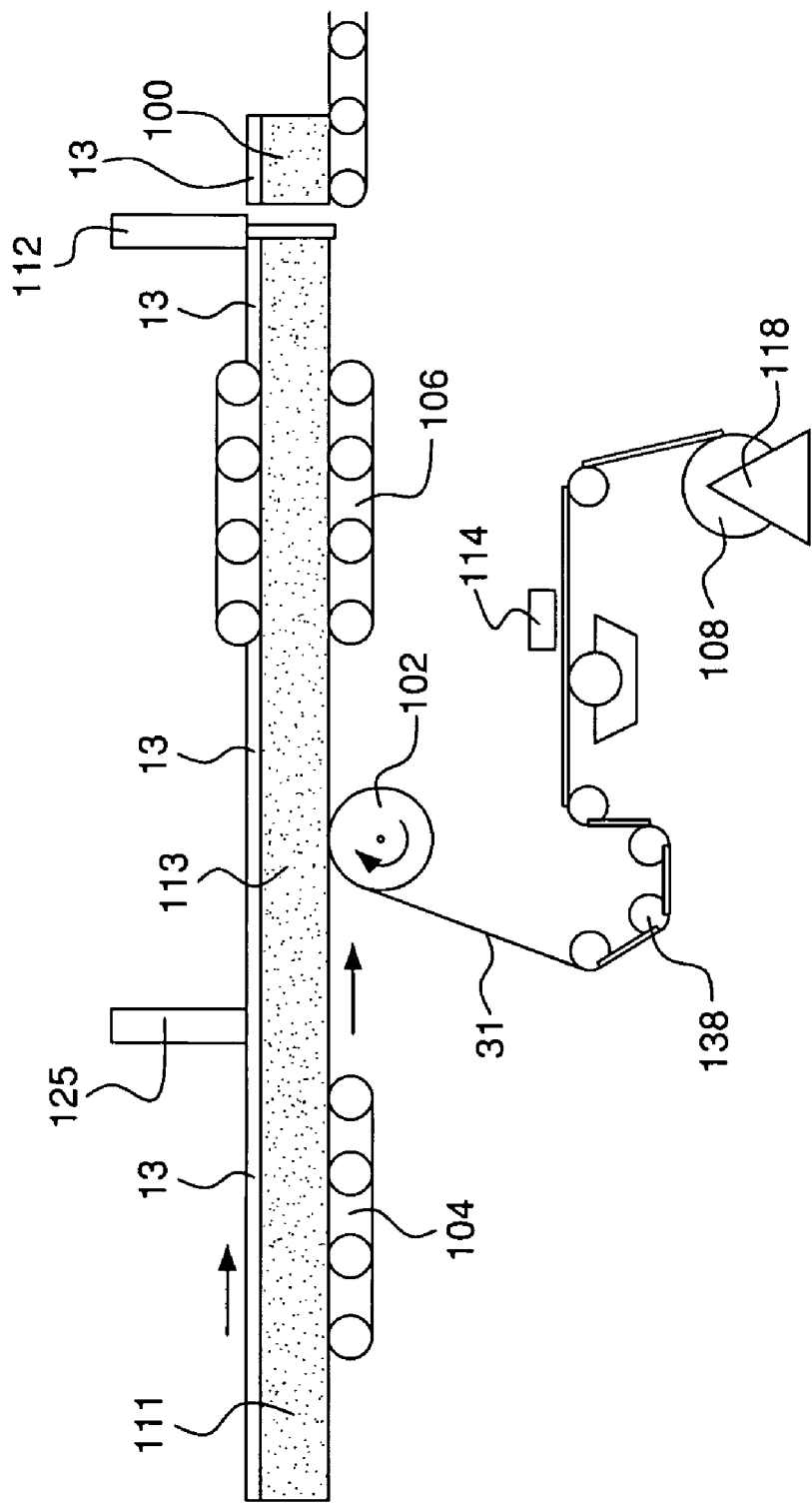
FIG. 4 is a schematic side elevation view of a process for providing a vapor retardant barrier to an insulation product.

While in an un-encapsulated insulation product, exposed surfaces can make installation troublesome, and often release unbound fibers and dust into the working environment, the present invention employs a nonwoven layer 13 that protects at least the first major surface 11 of the insulation blanket or mat 10. Alternatively, the nonwoven layer can coat one or both side surfaces 14 and 15, and even part or all of the second major surface 12, to dramatically reduce the release of unbound fibers and dust. In further embodiments, the nonwoven layer 13 can be applied to the cut end surfaces, after the chopper 112 step (FIG. 4).

The nonwoven layer 13 of this invention is preferably formed from a sheet of nonwoven material comprising randomly oriented inorganic fibers, and in a preferred embodiment, randomly oriented glass fibers. In an exemplary embodiment, nonwoven layer 13 is white glass nonwoven tissue sold by Lydall Manning Co. of Troy, N.Y. as MANNIGLAS® 1800 or MANNIGLAS® 1801E. The MANNIGLAS® 1800 nonwoven product has a specified density of 19.7-28.3 lb/2880 ft$^2$ and a thickness of about 5.9 mils. The MANNIGLAS® 1801E nonwoven product has a specified density of 19.7-28.3 lb/2880 ft$^2$ and a thickness of about 6.6 mils Nonwoven materials are sheets of randomly oriented natural or synthetic fibers, such as polyolefins, polyamide (i.e., nylon), polyester or rayon, or glass sometimes secured together by a binder, typically based on a polymeric material, such as an acrylic resin, a vinyl-acrylic resin, or the like. In some nonwovens, such as melt bonded polypropylene, the fibers are joined to each other by a melt bond, without additional resin.

In the insulation product embodiment of FIG. 1, the nonwoven layer 13 is secured to the randomly oriented inorganic fibers of the insulation mat by a heat cured binder agent, preferably the binder agent used in forming the mat 10 and sprayed on the mat fibers before the fibers are collected on the forming belt. The term "curing" or "cured" is used broadly to include various processes such as chemical reaction and or drying that cause the composition to set to a non-tacky solid and to permanently bond the components. "Heat cured" means cured using a thermal process, such as by the application of heat. The process for forming insulation product 100 is described below in connection with FIGS. 3A and 4.

In the insulation product 101 embodiment of FIG. 2, the nonwoven layer 13a is secured to the insulation mat at least in part by a melt bond between at least a part of nonwoven layer 13 and the fibers of the insulation mat 10. This melt bond may be in addition to or in lieu of a bond between the nonwoven layer 13 and the insulation mat 10 utilizing a heat cured binder agent as described above in connection with insulation product 100 of FIG. 1.

Figure 2A:
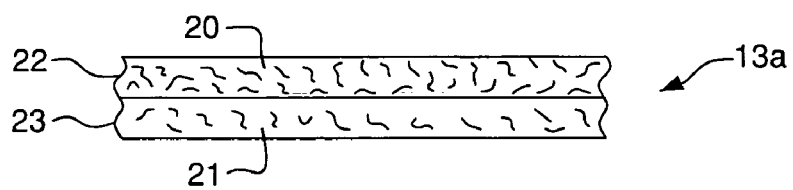
FIG. 2A is an enlarged, partial side view of the nonwoven layer of the insulation product of FIG. 2.

FIG. 2A is a partial side elevation view illustrating certain details of nonwoven layer 13a. In one embodiment, nonwoven layer 13a is a laminate structure including a first nonwoven layer 22 including first randomly oriented fibers 20. Nonwoven layer 13a also includes second layer 22, which is also preferably a nonwoven layer including second randomly oriented fibers 21. Fibers 20 are selected to have a melting point greater than that of fibers 21 such that fibers 20 do not melt while nonwoven layer 13a is bonded to the insulation mat 10, as described below in connection with the process of FIGS. 3B and 3C. In one embodiment, fibers 20 comprise glass fibers and fibers 21 comprise thermoplastic fibers such as polyester or polyolefin, such as polyethylene or polypropylene, or polyamide (i.e., nylon). Fibers 22 provide all or a portion of the melt bond between sheet 13a and the fibers of mat 10.

Figure 2B:
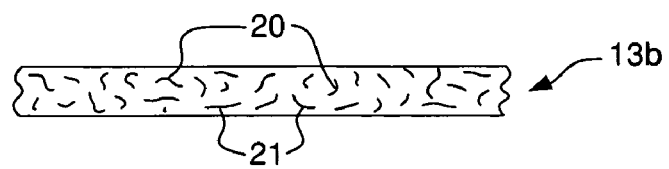
FIG. 2B is an enlarged, partial side view of an alternative nonwoven layer of the insulation product of FIG. 2.

In an alternative embodiment, nonwoven sheet 13b of FIG. 2B may be substituted for nonwoven layer 13a in the insulation product of FIG. 2. Nonwoven sheet 13b includes both first randomly oriented fibers 20 and second randomly oriented fibers 21 dispersed in a single layer. In one embodiment, fibers 21 are concentrated proximate to the bottom surface of nonwoven sheet 13b, i.e., that surface that contacts the mat 10. Alternatively, a woven fabric or film could be substituted for the sheets 13, 13a or 13b, so long as it can be bonded to the fibers of the batt and do not negatively interfere with the overall products characteristics and production machinery, e.g., steel belt conveyors.

As described above, in the insulation product 101 of FIG. 2, layer 13a or 13b is secured to the insulation mat 10 at least in part by a melt bond between at least a portion of the layer 13a or 13b and the fibers of insulation mat 10. When nonwoven layer 13a is used, layer 23, which includes second fibers 21, melts or at least partially melts during application of layer 13a to the mat 10. Sheet 13a is secured to the mat 10 when layer 23 cools. When nonwoven layer 13b is used, at least some of second fibers 21 melt during application of layer 13b to the mat 10. Layer 13b is secured to the mat 10 when fibers 21 cool.

Methods of manufacturing the insulation products 100, 101 are described below in connection with FIGS. 3A, 3B, 3C and 4. In some embodiments, the nonwoven layer 13, 13a or 13b is secured to at least the first major surface 11 as part of a continuous process that forms the insulation mat 10 or bats. A separate adhesive such as a hot melt adhesive is preferably not required to secure the nonwoven layer to the mat 10. This can be a factor in enabling the mat or batts of the present invention to achieve a "nonflammable" rating, or ASTM E-84 flame spread rating of 25 or less (See WO94/29540, p. 3) as described in the Background of the Invention section and in more detail below. The nonwoven layer 13 is at least applied to the first major surface 11, but may also be applied in some embodiments to the second major surface 12, side surfaces 14 or 15, the cut ends, or any combination of these surfaces.

Figure 3A:
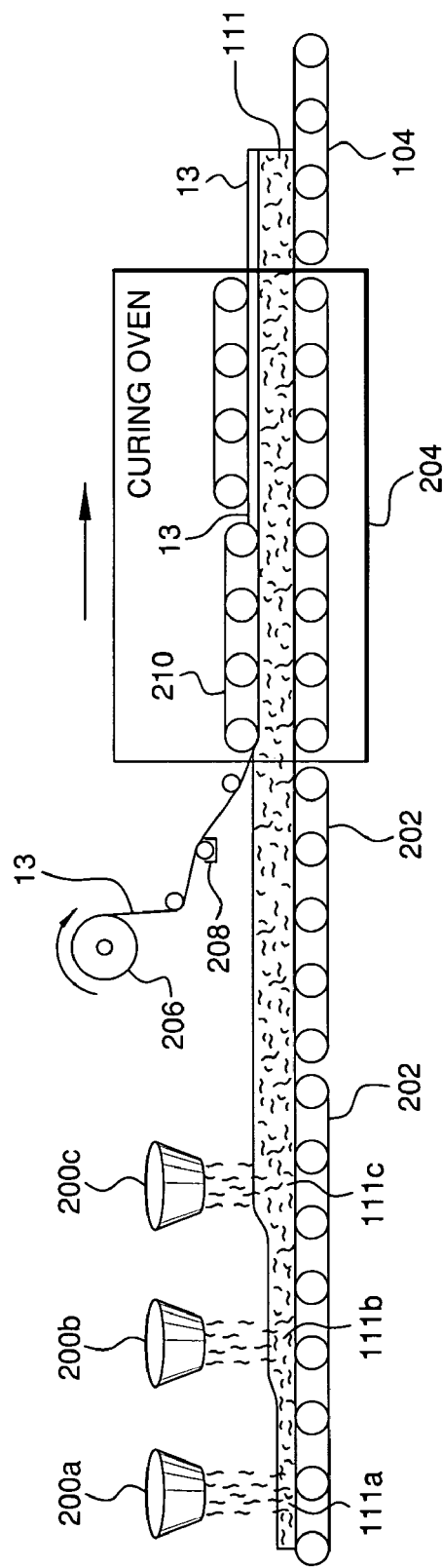
FIG. 3A is schematic side elevation view of a process for producing the insulation product of FIG. 1.

A first process for producing the batt insulation product 100 of FIG. 1 is shown schematically in the combination of FIGS. 3A and 4. As is conventional, a plurality of fiberizers 200a, 200b, 200c produce fibers that are sprayed with a heat curable binder and collected on a conveyor 202. The fibers accumulate on the conveyor 202, gradually increasing the thickness of the mat (illustrated by stages 111a, 111b and 111c) formed on the conveyor 202. A nonwoven sheet 13 is provided from a source, such as roll 206, to compression conveyor 210 within curing oven 204 to contact the nonwoven sheet to uncured mat 111c. If desired, additional (when compared to the conventional process) heat curable binder agent may be provided from the spray (not shown) that coats the fibers from fiberizer 200c and/or from an alternative source of binder agent, such as reservoir 208, which includes a roll applicator therein. Adding additional heat curable binder serves to ensure that there is a higher concentration of binder proximate to first major surface 11 of the mat sufficient to bond the nonwoven layer 13 to the fibers of the mat 10. The resultant structure, including the uncured mat 111c and the nonwoven layer 13, are conveyed through the curing oven 204 to cure the binder, thereby forming cured low density insulation mat 111 with nonwoven layer 13 bonded thereto.

In forming low density fiber glass insulation, curing oven 204 typically heats the uncured mat to a temperature between about 300-600° F., and preferably between about 400°-560° F., and more preferably between about 450-525° F., for a period typically between about 199 to 20 seconds (30-300 feet per minute (fpm)), and preferably between about 150-24 seconds (40-250 fpm), and more preferably between about 120-30 seconds (50-200 fpm) for a 100 foot long oven while the uncured mat is held and conveyed by a series of compression conveyors within the curing oven. Line speeds can be as high 100 m/min (300 ft/min) or higher. For this reason, nonwoven layer 13 preferably is preferably a sheet of randomly oriented glass fibers, which has a melting temperature above the temperatures within the curing oven 204, but may also include synthetic fibers, such as nylon and polyester. Because the nonwoven layer 13 includes fibers with higher melting points, the layer 13 remains intact and is bonded to the fibers of the mat 111 as the heat curable binder agent cures.

With respect to FIG. 4, a continuous glass fiber blanket or mat 111 formed in accordance with the process of FIG. 3A is presented by a feed conveyer 104 to a heated roll 102, to which is simultaneously supplied a continuous web of bitumen-coated Kraft paper web 31, fed between the heated roll 102 and the cured glass fiber mat 111. The web of Kraft paper fed via roller 102 of FIG. 4 after being bitumen-coated is supplied from a roll 108 on payout stand 118, through an accumulator 138 for tensioning the Kraft paper web 31. In addition, the outside surface of the web can be marked at a marking station 114 with identifying information such as the R-value of the glass fiber mat and the production lot code before the Kraft paper web 31 is applied to the bottom of the glass fiber mat 111. Optionally, the edges of the Kraft paper web 31 are folded over to form the side tabs 18, 19 (FIG. 1 or 2) just prior to the web contacting the heated roll 102. The Kraft paper web 31 is oriented so that the bitumen-coated side of the Kraft paper web 31 faces the bottom of the glass fiber mat 111. The temperature is preferably selected to provide enough heat to soften the bituminous coating such that the bitumen-coated Kraft paper web 31 adheres to the underside of the glass fiber mat 111. The faced glass fiber mat 113 is transported away from the heated roll 102 by a tractor section 106, and delivered to a chopper 112, which periodically chops the faced glass fiber mat 113 to form a mat 100 of appropriate length, e.g., 48-105" for insulation batts and 32-100' for insulation rolls. The insulation products 100 so formed are then transported to packaging equipment (not shown). Prior to facing the mat 11 with facing layer 31, the mat 111 may also be provided to a slicer 125 to slice the mat 111 to sections or strips having desired widths, e.g., 15". In this embodiment, lower facing layer 31 is provided from separate rolls 108 spaced to provide a facing layer 31 of appropriate width to each sliced section of mat 111.

The method of applying a nonwoven layer to an uncured mat shown in FIG. 3A was tested. A glass nonwoven layer 13 was adhered to a fiberglass insulation mat 111c with additional fiberglass insulation resin binder applied to the nonwoven layer 13 prior to curing oven 204. A tab-less Kraft paper was adhered to the second major surface of the mat 111 (FIG. 4) with asphalt to act as a vapor barrier. The cured and faced product was then cut. It was observed that the product exhibited improved cutability, with the nonwoven glass layer providing an improved cutting surface for compressing the mat during cutting. It was also observed that the nonwoven facing layer adhered to the insulation mat better than other encapsulated layers affixed to an already cured fiberglass mat with a hot melt adhesive. It is believed that this improved bond is attributable to affixing the nonwoven as part of the curing process where the nonwoven makes multiple bonds to the insulating fiberglass as opposed to localized point adhesive contacts to an already cured mat.

Figure 3B:
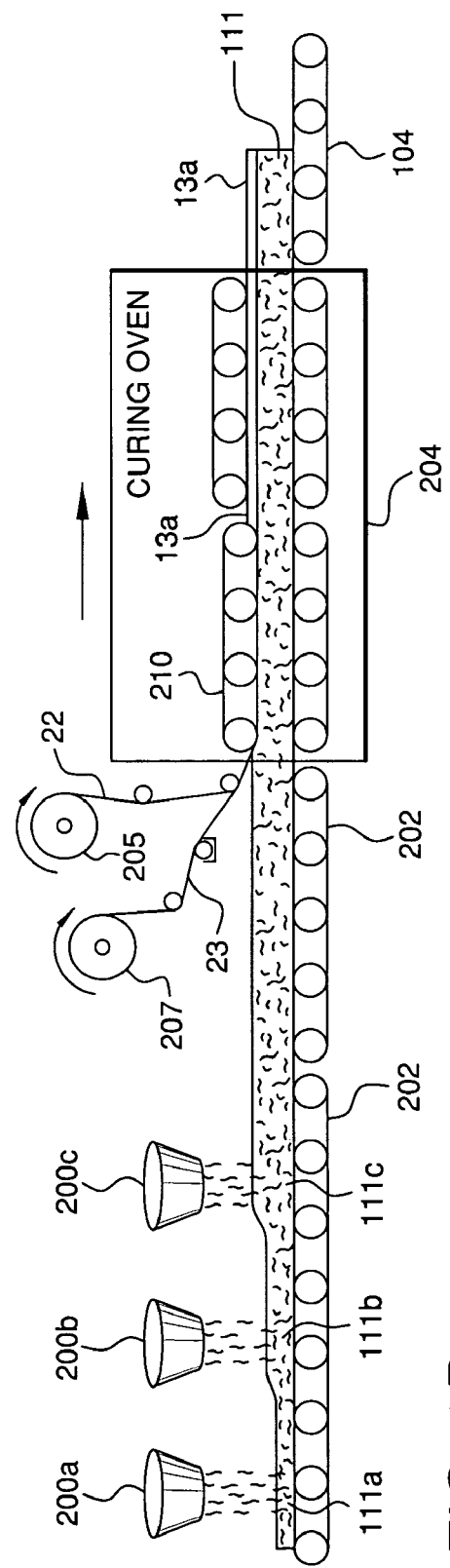
FIG. 3B is a schematic side elevation view of a process for producing the insulation product of FIG. 2.

Referring to FIG. 3B, a portion of the process for producing the batt insulation product 101 of FIG. 2 is shown. The same references are used to illustrate features in common with the process of FIG. 3A. The process of FIG. 3B is identical to the process of FIG. 3A, only laminate nonwoven layer 13a is applied to the uncured mat 111c. In the process of FIG. 3B, additional binder agent (described above) may not be necessary because of the melt bond that is formed between the layer 23, including the second fibers 21 described above, and the glass fibers of the mat 10. Nonwoven layer 22, including first fibers 20, is provided from roll 205. Nonwoven layer 23, including second fibers 21, is provided from roll 207. Alternatively, a single roll including pre-laminated sheet 13a may be used. The structure, including sheet 13a and uncured matt 111c, is then provided to the curing oven 204. Within the curing oven 204, the binder agent cures the mat 111 and possibly at least partially bonds mat 111 to nonwoven sheet 13a. In addition, at least a portion of layer 23, which includes fibers having a melting point at or below the curing oven temperature typically employed in the oven 204, melts. After the structure exits the curing oven 204, the melted layer 23 cools to form a melt bond with the fibers of the mat 111 and with the non-woven layer 22. Utilizing layer 22, which includes fibers 20 that have a higher melting temperature (e.g., glass fibers), maintains the integrity of the layer 13a during the process as well as prevents the layer 23 from sticking to the steel conveyor belt sections (not shown) that guide the structure through the curing oven 204. The resultant cured mat 111 with nonwoven layer 13a is then preferably provided to the process of FIG. 4 described above.

In an alternative embodiment of the process of FIG. 3B, rolls 207 and 205 can be replaced by a single source of sheet 13b, thereby providing a process that looks like the process of FIG. 3A only with sheet 13b at source 206. When the structure, including uncured mat 111c and nonwoven layer 13b, is conveyed through the curing oven 204, at least a first portion of nonwoven layer 13b (i.e., the portion(s) including second fibers 21) melts, while a second portion (i.e., the portions including first fibers 20) remains intact. After the structure exits the curing oven 204, the melted portions cool to form a melt bond with the glass fibers of the mat 111 and with the unmelted portions of sheet 13b. Utilizing a layer that includes fibers that have a higher melting temperature than used in the curing oven 204 (e.g., glass fibers) maintains the integrity of the layer 13b as well as prevents the layer 13b from sticking to the steel conveyor belt sections (not shown) that guide the structure through the curing oven 204. The resultant cured mat 111 with nonwoven layer 13b is then preferably provided to the process of FIG. 4 described above.

Figure 3C:
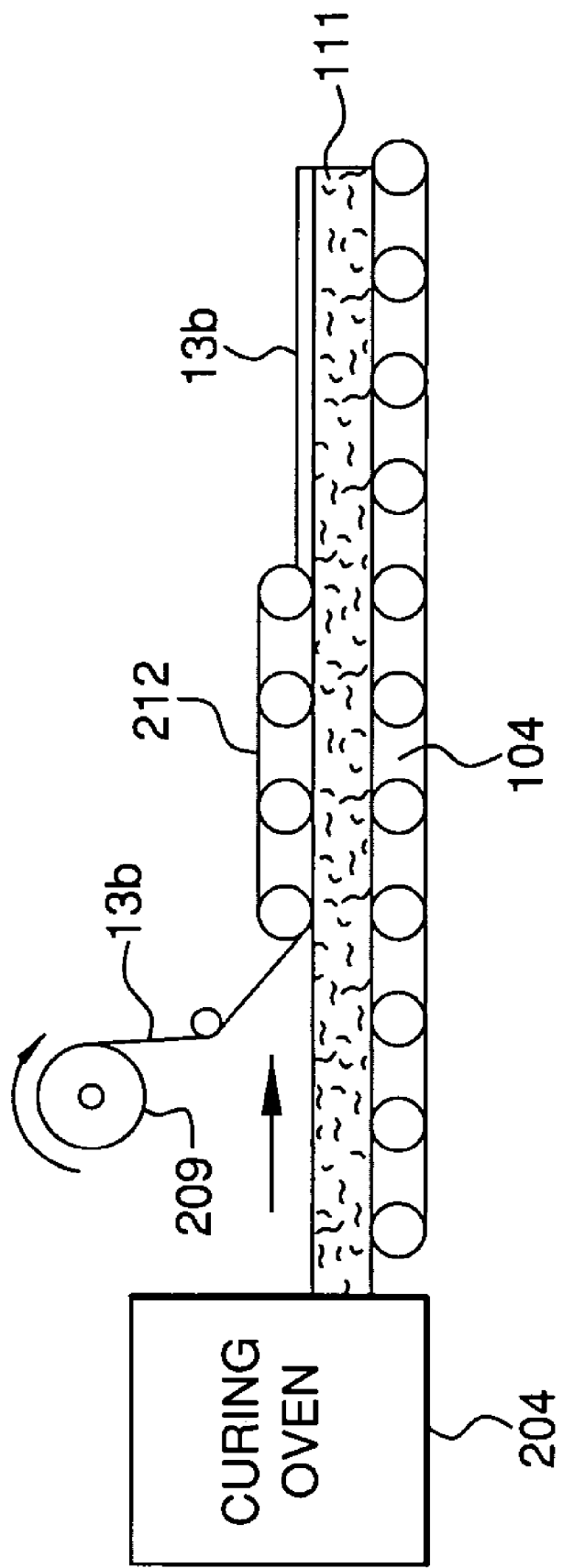
FIG. 3C is a schematic side elevation view of an alternative process for producing the insulation product of FIG. 2.

FIG. 3C illustrates another embodiment the process of forming the insulation product 101 of FIG. 2, in conjunction with the process of FIG. 4. After the curing oven stage 204, but while the mat 111 retains heat and is still at an elevated temperature, nonwoven layer 13b is provided from a roll 209 and applied to the first major surface of mat 111 via tractor section 212, which applies pressure and/or heat to, in essence, laminate the nonwoven sheet 13b to the fibers of the mat 111. As mentioned, this step is performed when the mat 111 is still at an elevated temperature that is above the melting point of the second fibers of nonwoven sheet 13b. Alternatively or in addition, tractor section 212 may supply the heat necessary to melt at least a portion of nonwoven sheet 13b. As described above in connection with FIG. 3B, if a nonwoven sheet 13a is applied instead of nonwoven sheet 13b, a dual source of the layers of a nonwoven sheet 13a (as shown in FIG. 3B) or a single source of a sheet 13a may substituted for roll 209 of sheet 13b.

Although not shown in FIG. 3A, 3B or 3C, nonwoven layer 13, 13a, or 13b may also be applied to second major surface 12 or even side surfaces 14 and 15 via appropriate placement of sources 206, 207 and 205 and 209, such as below the mat surface 12 and either before or after curing oven 204 in order to secure the nonwoven layer to surface 12. In this particular embodiment, the insulation product would not include a facing layer 31. Rather, a nonwoven layer would replace the facing layer 31, as shown in the embodiment 103 of FIG. 5.

Figure 5:
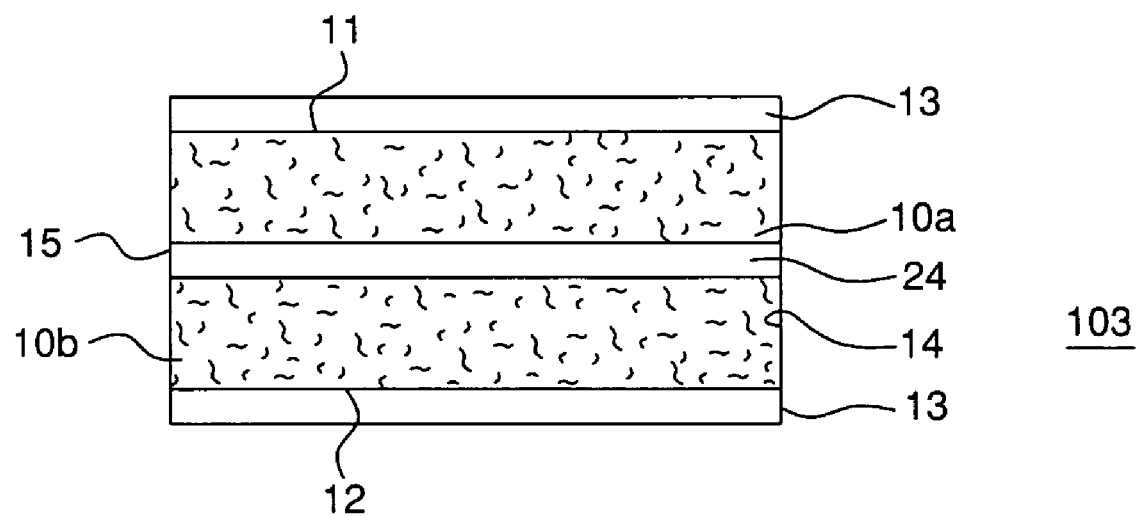
FIG. 5 is a side elevation view of an insulation product alternative of the present invention.

FIG. 5 also shows an intermediate reinforcement layer 24 between mat insulation layers 10a and 10b. In an exemplary embodiment, this layer 24 is also a nonwoven layer, preferably a glass nonwoven layer, provided within the insulation mat to reinforce the mat and to improve the mat's cutability. The layer 24 may be added to the uncured insulation mat in the process of FIG. 3A or 3B described above by, for example, providing the layer 24 from a roll disposed between fiberizing units 200 such that the layer is introduced at the appropriate location before the mat 111c is introduced to the curing oven 204 for curing. For example, if four fiberizing units are used, the layer can be introduced in between the second and third fiberizing units, with or without additional binder applied thereto. Alternatively, insulation mats may be formed via LPF (low pressure formation) processes, where binder treated fibers are deposited between two counter-rotating steel drums to compress the accumulated fibers into uncured mats for curing in an oven. Along with the fibers, a layer 24 may be introduced between the drums to form a part of the uncured, and eventually cured, mat.

In one embodiment, the nonwoven layer 13, 13a, or 13b is provided to at least one surface of the mat 10 with enough transparency or translucency to determine the color of the mat underneath. Of course, the nonwoven layer 13, 13a, 13b may also be opaque. The nonwoven layer 13, 13a or 13b may also include a color additive.

In preferred embodiments, the nonwoven layer 13, 13a, 13b is a highly porous membrane, which enables quick air escape from the batt under conditions of rapid compression, such as during packaging. In one embodiment, the vapor retarder facing material layer 17 and/or nonwoven materials described above may also be less than or equal to one mil in thickness, preferably less than about 0.6 mil in thickness, and most preferably less that 0.4 mil in thickness, so that the final insulation batt readily meets the ASTM E-84 test for flame spread. The mass of these layers in this embodiment must be sufficiently low to obtain a flame spread rating of about 25 or less in the absence of fire retardants. For the purposes of this disclosure, the term "the absence of fire retardants" means that the material either actually contains no fire retardants, or contains fire retardants in such an insubstantial amount that the facing, in the adhered condition, would still obtain a flame spread rating of 25 or less if the fire retardant were left out of the product. In addition, the nonwoven layers of this invention desirably is slippery to enable the batt to be pushed or slid into place on top of existing attic insulation, for example. Preferably, the coefficient of kinetic friction of the surface of the nonwoven layer is less than 1.0, when the nonwoven layer surface is pulled or dragged across the surface of an unfaced glass fiber batt having a density of about 7-12 kg/m$^3$ (about 0.4 to 8 lb/ft$^3$).

From the foregoing it can be realized that this disclosure provides improved methods of making low density insulation product, containing nonwoven layers applied as a part of the conventional mat formation process and/or without the need for additional adhesives. The low density insulation product produced thereby produces a fire resistant, low friction, air permeable and water vapor permeable surface that is very desirable for an inorganic fiber insulation product. Improved adherence of the nonwoven layer to the insulation mat or batt may also be achieved. This is very cost efficient since it generally eliminates the need for multiple sizes of nonwovens or films for different product sizes because the nonwoven layer is applied to the insulation mat prior to cutting and/or slicing as an integral part of the mat formation process itself.

Still further, the nonwoven layer, particularly when comprising glass fibers, provides an excellent surface for field cutting of the insulation product. Low density insulation mats with polyester or nylon facing layers have proved difficult to field cut. In addition, these polyester and nylon facing layers cannot withstand the heat of the curing oven and must be adhered to the already cured mat by a separate post-curing process using an adhesive. With the recent proliferation of building supply superstores and upsurge in "do-it-yourself" mind-set, many individuals have elected to install insulation themselves, rather than rely on professionals. The improved cutting surface eliminates the need for costly one-time purchases of specialized cutting tools. Further, glass nonwoven layers are less expensive that synthetic films, thereby providing a more cost conscious consumer (and professional) product.

Although various embodiments have been illustrated, this is for the purpose of describing and not limiting the invention. Various modifications, which will become apparent to one of skill in the art, are within the scope of this invention described in the attached claims.

What is claimed:

1. An insulation product comprising:
    a low density, non-rigid and compressible mat containing randomly oriented glass fibers bonded by a heat cured binder, said mat having first and second major surfaces and a pair of side portions; and
    a nonwoven sheet bonded to said first major surface, said nonwoven sheet comprising first randomly oriented fibers and second randomly oriented fibers, said first randomly oriented fibers having a melting point above a temperature used in curing said mat and said second randomly oriented fibers having a melting point below said temperature used in curing said mat, said nonwoven sheet bonded to said first major surface at least in part by a melt bond between said second randomly oriented fibers and said randomly oriented glass fibers in said low density mat.

2. The insulation product of claim 1, wherein said first fibers of said nonwoven sheet comprise glass fibers.

3. The insulation product of claim 2, wherein said second fibers of said nonwoven sheet comprise polymeric fibers.

4. The insulation product of claim 1, wherein said nonwoven sheet comprises a laminate, said laminate comprising a first layer including said first randomly oriented fibers and a second layer including said second randomly oriented fibers.

5. The insulation product of claim 4, wherein said first fibers of said nonwoven sheet comprise glass fibers.

6. The insulation product of claim 5, wherein said second fibers of said nonwoven sheet comprise polymeric fibers.

7. The insulation product of claim 4, wherein at least some of said second randomly oriented fibers are melt bonded to said first layer.

8. The insulation product of claim 1, wherein said low density mat has a density of less than about 2 pounds per cubic foot and a thickness of greater than about 2 inches.

9. The insulation product of claim 8, wherein said low density mat has a density of less than about 1.5 pounds per cubic foot and a thickness of greater than or equal to about 3.5 inches.

* * * * *